United States Patent

Groom et al.

[15] 3,696,351

[45] Oct. 3, 1972

[54] RECORDING HEAD MOUNTING AND ACTUATOR COMBINATION

[72] Inventors: Robert G. Groom, Thousand Oaks; Collen K. Brimm, Canoga Park, both of Calif.

[73] Assignee: Burroughs Corporation, Detroit, Mich.

[22] Filed: Nov. 23, 1970

[21] Appl. No.: 91,729

[52] U.S. Cl.......................340/174.1 C, 340/174.1 E

[51] Int. Cl.........G11b 5/50, G11b 21/26, G11b 5/60

[58] Field of Search.................340/174.1 E, 174.1 C; 179/100.2 P

[56] References Cited

UNITED STATES PATENTS

| | | | |
|---|---|---|---|
| 3,229,268 | 1/1966 | Solyst | 340/174.1 E |
| 3,249,701 | 5/1966 | Silver | 340/174.1 E |
| 3,585,618 | 6/1971 | Stansell | 340/174.1 E |

*Primary Examiner*—J. Russell Goudeau
*Attorney*—Christie, Parker and Hale

[57] ABSTRACT

A recording head mounting arrangement is provided for precisely positioning a plurality of recording heads in a housing adjacent a face of a magnetic memory disk. Each recording head is mounted on an individual assembly for individual removal if desired. Holes for mounting the head assemblies are provided in the housing in precise positions and means are provided for keying the assemblies to the housing for maintaining head orientation. Each individual assembly comprises a circular body extending through the housing with the head mounted on a conventional gimbal spring inside the housing. A pneumatic actuator is concentric with the circular body for advancing and retracting the head. Means are provided for passing electrical leads from the recording head to the outside of the housing.

2 Claims, 3 Drawing Figures

PATENTED OCT 3 1972

3,696,351

INVENTORS
ROBERT G. GROOM
COLLEN K. BRIMM
BY
Christie, Parker, & Hale
ATTORNEYS

RECORDING HEAD MOUNTING AND ACTUATOR COMBINATION

BACKGROUND

A significant item of peripheral equipment for digital computers or the like is a magnetic memory system employing a rapidly rotating disk on the surfaces of which is a magnetic recording material for recording magnetic signals. A plurality of magnetic transducers commonly mounted in groups in recording heads are arranged adjacent the faces of the disk for writing and reading magnetic signals thereon.

It is common practice to support the recording heads adjacent to the rapidly rotating disk on an air bearing which forms naturally between the rapidly moving disk surface and the stationary recording head. Because the heads ride extremely close to the disk surface during operation, the disk is commonly mounted in a substantially closed housing slightly pressurized with extremely clean, filtered air to avoid any particles of contamination that might catch between the disk and head and cause damage to one or both of these articles.

In operating such a system, the magnetic recording head is retracted from the surface of the disk when it is stopped or rotating at low speed, and after the disk has been brought to operating speed the recording heads are pressed toward the disk surface by pneumatic pressure. Such an operating system employing a magnetic recording disk and a plurality of magnetic transducers is described and illustrated in U.S. Pat. No. 3,229,268 and another is shown in U.S. Pat. 3,320,599.

Magnetic memory disks have become larger and larger in recent years in order to increase storage capacity as the requirements for large computer memories have increased. Disks about three feet in diameter are now employed and it becomes necessary to provide a housing of rather substantial size in order to accommodate such a disk.

In order to write and read reliably on a recording disk, whether large or small, it is important that the position of the magnetic recording heads be determined with precision particularly in the radial direction. Precise radial positioning is important since circumferentially extending recording tracks on the disk are spaced as closely together as possible for maximum recording density. Typically, each recording head has a plurality of individual magnetic transducers each recording on an individual recording track. Since these transducers must be physically spaced apart in the recording head, recording on adjacent tracks is accomplished by interlacing the recording tracks from one recording head with those from other recording heads. Such interlacing requires precise radial positioning of the recording heads to avoid cross-talk between adjacent recording tracks. It is important to know the circumferential position of the recording heads so that the position of data written on the disk is well known for retrieval. This latter can be found from clock pulses recorded on the disk.

In order to precisely position recording heads in a disk memory system, a relatively large area aperture has been left in each side of the housing. A plurality of recording heads are mounted on a single head mounting plate in well known positions. The plate is sealed in the housing aperture so that the relative positions of the heads used with the recording disk are well known.

Such a mounting arrangement is convenient for manufacture but raises substantial problems for maintenance. If a recording head or its associated paraphernalia becomes damaged or fails for some reason, or if a substantial number of transducers within the recording heads fail during operation it becomes necessary to replace or repair transducers. In such a situation it has been necessary to remove the entire head mounting plate in order to have access to the recording heads. This leaves a gaping hole in the side of the housing into which dust, dirt and other minute particles may be transferred. It has, therefore, been necessary to provide a clean environment within which to remove a head mounting plate, make necessary repairs and replace the plate.

Preferably, this is accomplished in a "clean room" having filtered air and only a very minimum of particulate contamination. Such clean rooms are quite expensive and are not available in many field applications. For some field maintenance situations, a closed hood can be provided over an entire housing and purged with clean air to provide an environment within which a mounting plate can be removed for maintenance. Such an arrangement is clearly cumbersome and maintenance using such an arrangement is difficult and expensive.

A head mounting plate for a large magnetic memory disk file is rather large and, hence, difficult to handle and may have more than forty individual recording heads mounted thereon. In order to remove such a plate for maintenance pneumatic and electrical connections to each of the recording heads must be removed before the plate can be removed. Since both faces of the disk are employed for recording, two different styles of head mounting plates are required for the left and right hand sides of the housing, respectively. In addition, it is often desirable to provide so-called clock heads about 180° around the disk from the recording heads and this necessitates two additional styles of head mounting plate.

With a large number of recording heads mounted on the plate it becomes difficult to assure the alignment and attitude of all of the heads prior to installation in the disk file. This can, of course, be accomplished with moderate difficulty in a manufacturing situation but is extremely difficult in a field maintenance situation. It should be noted, in this regard, that not only the position of the recording head is of concern, but also the orientation of the head about three orthogonal axes. Assuring correct orientation of over forty heads on a mounting plate in a field situation is clearly a difficult proposition. Even in a manufacturing situation it is desirable to test the heads as assembled prior to mounting adjacent a disk. The heads, actuators, and other parts can be tested separately, but may not perform as expected when assembled together. Testing of each of many heads on a single mounting plate for attitude, orientation, free extension and retraction and electrical performance is quite difficult and expensive.

It is, therefore, desirable to provide a magnetic head mounting arrangement that does not sacrifice precise positioning of recording heads, permits testing of assembled heads, and permits field maintenance without significant danger of contamination.

BRIEF SUMMARY OF THE INVENTION

There is, therefore, provided in practice of this invention according to a presently preferred embodiment, an individual mounting for a magnetic recording head comprising a head supporting body on which a magnetic recording head is mounted in a predetermined position. Means are provided for connecting and sealing the body to a mounting support in a predetermined orientation. In the assembly there is also provided means for advancing and retracting the recording head. In a preferred arrangement, a plurality of such individual recording head mountings are positioned in individual apertures through a substantially closed housing surrounding a rotatable magnetic memory disk.

DRAWINGS

These and other features and advantages of the present invention will be appreciated as the same becomes better understood by reference to the following detailed description of a presently preferred embodiment when considered in connection with the accompanying drawings, wherein.

Throughout the drawings like numerals refer to like parts.

DESCRIPTION

Figure 1:
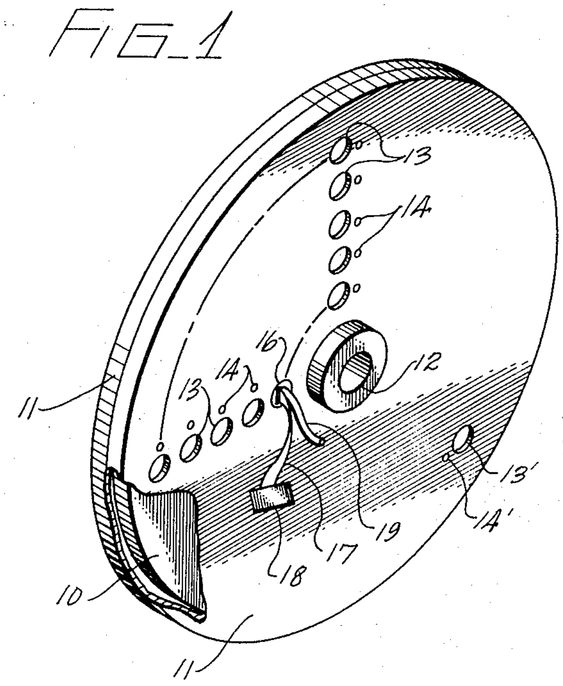
FIG. 1 illustrates schematically, in perspective, a magnetic memory disk system constructed according to principles of this invention.

FIG. 1 illustrates schematically a magnetic memory disk file system constructed according to principles of this invention. As illustrated in this presently preferred embodiment, a magnetic memory disk 10 is mounted in a housing formed of two similar halves 11 bolted or otherwise fastened together so as to surround the disk. A mounting hub 12 is employed for supporting the housing halves 11 and also the disk 10 for rotation within the housing.

It will be apparent to one skilled in the art that only the broadest outlines of the housing are illustrated herein, and that many accessory elements are required in an operational magnetic memory disk system. Thus, for only one example, means are provided for continually supplying and recycling air within the housing so that no particulate matter will be present adjacent the disk.

A mechanical drive (not shown) is connected to the hub 12 for rotating the disk at a controlled speed. Various other conventional mechanical mountings, and electrical and pneumatic connections are also omitted from the illustration of FIG. 1, since they do not form a portion of this invention and the details of which are not needed for an understanding of the practice of this invention.

The housing 11 is provided with a plurality of circular apertures 13, two rows of which are illustrated and the location of other similar apertures only indicated generally. The precise arrangement of such apertures is not of importance and a number of suitable arrangements can be provided by one skilled in the art. In the illustrated arrangement the apertures are clustered in one portion of the housing. In other embodiments the apertures may be more or less uniformly scattered around the housing.

Adjacent each of the apertures 13 is a small blind hole 14 useful for recording head positioning as hereinafter described. In the illustrated embodiment an aperture 13° and hole 14° similar to the closely arrayed holes 14 and apertures 13 is provided approximately 180° around the housing from the closely clustered apertures for mounting a so-called clock head. A clock head is employed during operation of the disk memory file for measuring disk position during rotation. Other heads than the illustrated one may be used as a clock. The apertures 13 and holes 14 are bored or drilled into the housing 11 in predetermined positions so that when recording head assemblies are subsequently mounted therein, the recording heads are also maintained in predetermined positions particularly precisely in a radial direction. In order to accomplish this, it is preferred to machine the entire ensemble of holes and apertures in a single tooling setup in order to maintain dimensional tolerances. In order to assure proper orientation and positioning it is preferred that each pair of associated aperture and hole be located either on a common radius of the housing or on a common circumferential line. This provides greatest ease of manufacture without loss of precision. Thus, for example, an aperture can be bored at a selected radial distance and the housing rotated to drill an alignment hole at the same radial distance on a circumferential line common to the center of the aperture.

When a magnetic memory disk file such as illustrated in FIG. 1 is used, a recording head assembly 16 is mounted in each of the apertures 13. In FIG. 1, only a single one of the recording head assemblies is illustrated in position in an aperture 13 for purposes of clarity. A greater number would merely obscure the drawing, and all are substantially identical. Each of the recording head assemblies 16 includes a flat ribbon 17 of electrical leads for connection to the recording head and typically the leads 17 terminate in a small printed circuit board 18 for connection to other elements of the memory system. Each assembly 16 also includes a small plastic pneumatic tube 19 for actuating the recording head as hereinafter described in greater detail.

In the illustration of FIG. 1 a lead ribbon 17 and terminal board 18 and pneumatic tube 19 are all shown merely loosely protruding from the recording head assembly 16. It will be apparent, of course, that in an operational magnetic memory disk file, these elements may be secured to the housing at appropriate locations for connection to other portions of the system.

Figure 2:
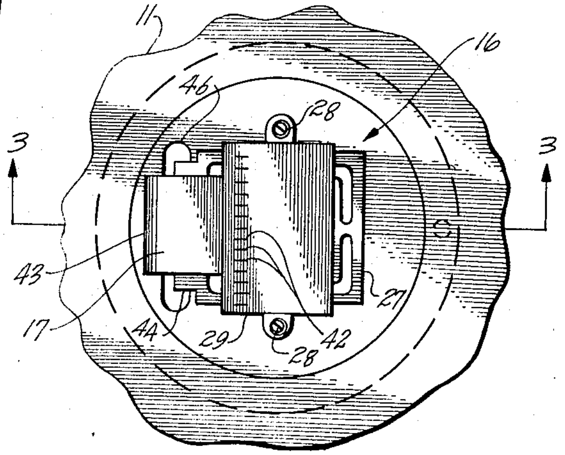
FIG. 2 illustrates an individual recording head mounting viewed from inside the housing of FIG. 1.
Figure 3:
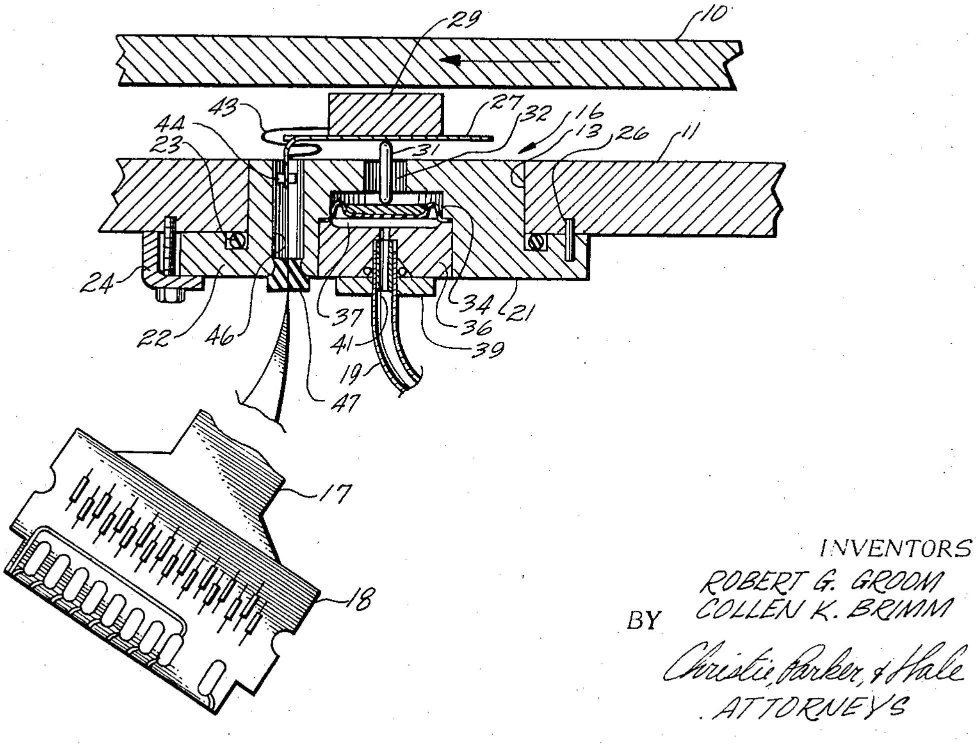
FIG. 3 is a transverse cross section through the assembly of FIG. 2.

FIGS. 2 and 3 illustrate in greater detail a magnetic head assembly constructed according to principles of this invention. FIG. 2 is an elevation of an assembly 16 viewed from the inside of the housing 11 and FIG. 3 is a transverse cross section through the assembly 16.

Each of the assemblies comprises a circular or cylindrical body 21 that fits snugly in one of the apertures 13 in the housing so that when fitted in place in the precisely positioned aperture the body is held in a precise position. In the illustrated arrangement the cylindrical body fits snugly throughout the depth of the aperture through the housing. However, it will be apparent that precise positioning of the body can be obtained when the aperture is counterbored or relief is provided on the body to permit easy assembly and disassembly while still maintaining precise position.

A peripheral flange 22 surrounds the body 21 on the exterior of the housing and includes a groove for an O-ring 23 which seals the body to the housing, thereby minimizing air leakage and helping to maintain the environment in the housing free of particulate material. Three L-shaped clamps 24 (only one of which is seen in FIG. 3) are bolted to the housing 11 so as to fit onto the flange 22 and hold the body in tight engagement with the housing. In the illustrated embodiment it is preferred to employ such external clamps 24 since they can be arranged around selected portions of a flange so as to be free of interference with adjacent recording head assemblies. This permits the use of a flange 22 as narrow as possible so that recording head assemblies can be quite closely spaced on the housing 11 without mutual interference. It will be apparent, of course, that bolts through a somewhat wider flange can be employed for fastening the assemblies to the housing when more widely spaced apart.

A hole, or slot, at one edge of the flange 22 accommodates a positioning pin 26 which is also fitted into the blind hole 14 on the housing thereby keying the assembly to the housing in a precisely predetermined orientation. Such a keying arrangement is preferred since easy to manufacture with precision and economy, however, other suitable keying arrangements will be apparent to one skilled in the art.

A conventional gimbal spring 27 is mounted on the inside face of the body 21 by a pair of bolts 28 threaded into counter-bored holes (not separately shown) in the internal face of the body 21. These counter-bored holes serve to precisely position the gimbal spring on the body in both attitude and position and are preferably drilled in the same tooling setup as the hole in the flange 22 for accommodating the positioning pin 26. In this manner, a magnetic recording head 29 precisely positioned on the gimbal spring 27 is located in a predetermined position relative to the housing 11 when the assembly 16 is inserted in one of the apertures 13.

Thus, it will be seen that the precise interrelation of the several recording heads in a magnetic memory disk file is determined by the original positioning of the apertures 13 and alignment holes 14. The individual magnetic recording head assemblies 16 are readily formed substantially identical to each other with the holes for the bolts 28 and pin 26 precisely positioned relative to each other and also relative to the circular surface of the body 21.

Such individual recording head assemblies are assembled in the factory and completely checked out for recording head position and attitude, electrical characteristics of the head, and also proper actuation. This completely tested assembly is readily cleaned in the factory and is sealed in a container for maintaining cleanliness for shipment to field installations for replacement. A damaged, inoperative, or obsolete head assembly removed in the field can then be returned to the factory for refurbishment and recalibration. Factory checkout of assembled heads and actuators for field installation has been difficult since such assembly has been completed in the field. Faulty field assembly is avoided in practice of this invention.

As mentioned hereinabove, a recording head is typically advanced to a position closely spaced from the disk 10 during recording operations and remains retracted until the disk reaches operating speed. The gimbal spring 27 biases the recording head away from the disk toward the retracted position as well as providing for a small degree of tilt of the head about axes parallel to the surface of the disk. The head orientation assures proper operation of the air bearing that forms between the head and the disk.

In order to overcome the bias of the gimbal spring and advance the head toward the disk for recording operations, a pneumatic actuator is provided with air pressure supplied through the tube 19. The pneumatic actuator is formed principally in a cavity in the body 21 and comprises a piston pin 31 axially movable in a guide sleeve 32 mounted in the body 21 concentric with the circular external surface. The concentricity of the piston pin with the aperture 13 is thus assured and positioning relative to the head 29 gives proper head actuation. The piston pin 31 bears at one end against the gimbal spring 27 and at the other end against a rigid piston disk 33 in contact with a flexible diaphragm 34. A circular retainer 36 holds the periphery of the diaphragm and provides a small air chamber 37 adjacent one face of the diaphragm. The plastic tube 19 is inserted in a hole in the retainer 36 and is secured in place by an O-ring 38 pinched between a chamfer around the hole in the retainer and a clamping ring 39. The inwardly directed pressure of the O-ring 38 is resisted by a rigid sleeve 41 inserted in the end of the flexible plastic tube 19. Bolts (not shown) into the body 21 hold the clamp ring 39 and retainer 36 in position. In operation, air pressure applied to the chamber 37 through the tube 19 actuates the diaphragm 34 and presses the piston pin 31 against the gimbal spring 27 thereby advancing the head 29 toward the recording disk 10. Release of pneumatic pressure enables the bias of the gimbal spring 27 to return the head to its retracted position.

A number of electrical leads are required for the magnetic transducers 42 mounted in the recording head. These electrical leads are preferably in the form of a flat ribbon 17 having substantial flexibility. The ribbon 17 is brought in a generally S-shaped curve 43 from an edge of the head 29 so as to minimize the amount of force applied to the head by the leads. The leads are then fastened to a tab 44 on the gimbal spring and led through an oblong passage 46 through the assembly body 21, so that they pass from the interior of the housing to the exterior thereof. The passage 46 is sealed by a slit oblong stopper 47, fitted around the ribbon 17 of leads. In order to install the head in the assembly the ribbon of leads 17 is folded along a line approximately 45° to its length and the printed circuit board 18 is passed through the oblong passage 46 in a lengthwise direction from the inside to the outside. The split stopper 47 is then fitted around the ribbon of leads 17 and inserted in the passage to effect a seal.

If it becomes necessary to replace a transducer in a magnetic memory disk file, the individual recording head mounting arrangement provided in the practice of this invention permits replacement under field conditions rather than returning the entire disk file to a clean room for maintenance.

Typically, a magnetic memory disk system includes a small pump and filter system for maintaining a slight positive pressure within the housing for the disk. This assures a continuous flow of clean filtered air into the housing. In order to change a transducer, a small shield (not shown in the drawings) is placed above the transducer assembly to be replaced. The shield prevents falling objects from entering the aperture 13 from which the head mounting body is removed. Electrical connections to the recording head are broken by unplugging the printed circuit board 18. The pneumatic connection to the head actuator is disconnected, typically by loosening the clamping member 39 thereby relieving the load on the O-ring 38 and permitting the tube 19 to be withdrawn. If desired, the pneumatic connection can be broken at its opposite end. The clamps 24 are then loosened so that the transducer assembly 16 can be removed from the aperture 13. The slight positive pressure of clean air within the housing causes an outflow of air through the aperture thereby preventing dusty air from entering.

Another pretested recording head assembly is then slipped in place in the aperture and the electrical and pneumatic connections reestablished. Typically, the entire replacement recording head assembly is cleaned, aligned, and tested or calibrated at the factory and sealed into a clean container. The very short time required for removing the assembly from the container and inserting it into the aperture does not give any substantial likelihood of picking up contamination from the environment. The individual recording head mounting assembly permits a transducer to be changed in the field thereby keeping the magnetic memory system in place and minimizing lost time required for maintenance.

Although but one embodiment of magnetic memory disc system having recording head mounting assemblies constructed according to principles of this invention has been described and illustrated herein many modifications and variations will be apparent to one skilled in the art. Thus, for example, instead of using a cylindrical body closely fitted into a cylindrical aperture for positioning, the head mounting body may fit loosely in the aperture with positioning obtained by a pair of cylindrical pins mounted on the housing. Pins or other keying means on the head mounting body to fit holes in the housing can be used. Other arrangements for mounting a single head on each head mounting body can also be employed. It is, therefore, to be understood that within the scope of the appended claims the invention may be practiced otherwise than as specifically described.

What is claimed is:

1. A magnetic memory system comprising:
 a rotatable magnetic memory disk;
 a substantially enclosed housing surrounding the disk;
 a plurality of cylindrical apertures through the housing adjacent each face of the disk and spaced radially and circumferentially from each other;
 a plurality of individual recording head assemblies, each in its respective aperture, each recording head assembly comprising:
  a head support body having one face inside the housing and the other face outside the housing and a cylindrical portion therebetween complementary to the cylindrical portion of the aperture;
  a single recording head mounted adjacent the inside face of the body in a predetermined position;
  means for advancing and retracting the head;
  sealed means for passing electrical leads from the recording head to the outside face of the body; and
  means for sealing each recording head assembly to the housing;
 an outwardly facing alignment hole in the housing adjacent each aperture;
 an alignment hole in each head support body facing the inside of the housing;
 a pin positioned between the respective holes for orienting each recording head assembly in a predetermined position; and
 at least a pair of holes in the head support body for aligning the recording head, each of the three alignment holes in the head support body being precisely positioned relative to each other and the cylindrical portion of the body.

2. A combination as defined in claim 1 wherein the means for advancing and retracting the head comprises:
 a piston concentric with the cylindrical portion of the body and in operative engagement with the recording head;
 a pressure responsive diaphragm in operative engagement with the piston; and
 means for applying pneumatic pressure to the diaphragm.

* * * * *